United States Patent [19]

Milligan

[11] 4,367,979
[45] Jan. 11, 1983

[54] CONNECTOR DEVICE

[75] Inventor: Donald L. Milligan, Wirral, England

[73] Assignee: Hoyle Marine Limited, Wallasey, England

[21] Appl. No.: 195,890

[22] Filed: Oct. 9, 1980

[30] Foreign Application Priority Data

Oct. 9, 1979 [GB] United Kingdom ................. 7934937

[51] Int. Cl.³ ............................................. E02B 15/04
[52] U.S. Cl. ..................................... 405/70; 403/353;
403/362; 403/315
[58] Field of Search .................... 405/70; 24/201 HH;
403/340, 341, 362, 315, 381, 380, 353, 393, 339

[56] References Cited

U.S. PATENT DOCUMENTS 3,848,417 11/1974 Smith et al. ........................... 405/70
4,155,664 5/1979 Acheson ......................... 403/331 X
4,295,756 10/1981 Blair ..................................... 405/70

FOREIGN PATENT DOCUMENTS 498052 1/1939 United Kingdom ................ 403/362

Primary Examiner—Andrew V. Kundrat
Attorney, Agent, or Firm—Zarley, McKee, Thomte, Voorhees & Sease

[57] ABSTRACT

A connector device for joining the ends of oil boom sections comprising two connector members (1, 2) and co-operating oppositely arranged channel portions (9, 9′) which are readily interengageable but which are shaped so they have to execute parallel relative displacement before disengagement of the channel portions is possible and releasable securing means (11) locatable so as to extend between the channel portions (9, 9′) to prevent disengagement thereof.

12 Claims, 1 Drawing Figure

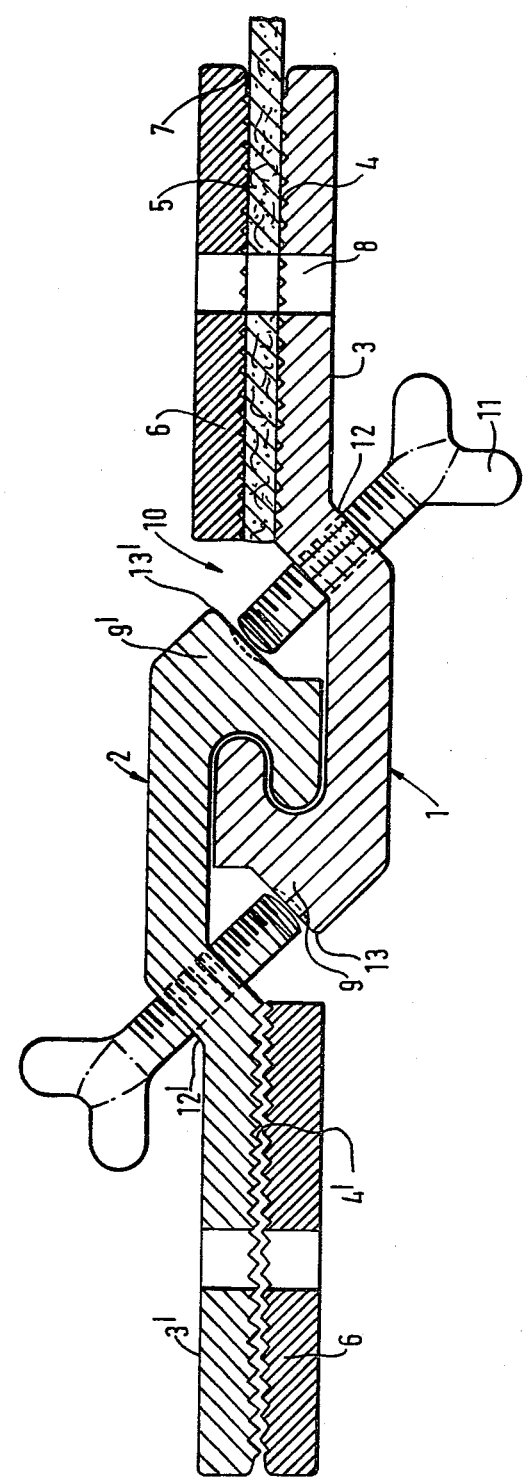

CONNECTOR DEVICE

The present invention relates to a connector device for joining together floating boom lengths or sections to form floating booms which, for example, act as floating oil containment barriers, as safety barriers, or as rubbish containment barriers.

Floating oil booms are normally comprised of individual lengths or sections joined together to form the boom of desired length. The interconnection between the sections of the boom have hitherto not proved entirely satisfactory. In one known connection, the components of a connecting device are secured to the ends of different boom sections and one section of the connector device is interengaged with the other part by lifting the end of the boom and connector section and dropping such over the end of the other connector device so as to slidably interengage such—somewhat in the manner of a dove-tail arrangement and the interconnection may then be secured by means of pins or bolts. Such an arrangement is not entirely satisfactory especially when operating in the dark and/or rough weather since difficulty may be experienced in raising the end of one boom section and interengaging the connector sections and subsequently locking such with a connector pin through holes required to be aligned.

It is also known to interconnect sections of an oil boom by means of two identical but oppositely facing end plates, each secured to an end section of a boom wherein the end sections of the boom have a flanged portion extending inclinedly away from the end of its boom sections so that two connector devices may be interengaged by bringing such together in a direction inclined to the plane in which the plates lie, i.e. normally substantially the vertical plane; once the V-hook like ends of the connector devices are interengaged they are locked in position by inserting a retaining pin through apertures extending through each. The disadvantage of this arrangement resides in the difficulty of ensuring alignment of the holes for insertion of the retaining pin and this is especially so in rough sea conditions, at night, and where substantial oil exists in the area.

It is an object of the present invention to provide a connector for the sections of an oil boom which is both readily interengageable and securable in position.

According to the present invention there is provided a connector device for joining the ends of an oil boom length or section to another length or section, comprising two connector members with each member having a portion securable to the end of an oil boom section and, extending from said portion, an interconnecting channel portion shaped and dimensioned so as to cooperate with the oppositely arranged interconnecting channel portion of the other connector member such that when the channel portions are pulled in opposite, outward directions, the channel portions interengage, and such that to disenage the channel portions of two members, the connector members have to execute a parallel or substantially parallel relative displacement with respect to each other with said securable portions moving towards each other before disengagement of the channel portions is possible, and securing or locking means locatable so as to extend into a space into which one of the interengaged connector members moves during said parallel displacement during disengagement so as to prevent said parallel displacement and thereby interlock the two members, said securing means being also releasable to permit separation of said two members by said parallel displacement.

The connector device normally comprises two identical connector members each securable to the end of a boom section and may have a single locking means between the two members or a locking means may be provided on each member of the device.

It will be appreciated that the provision of locking means to prevent the parallel displacement of the two members prior to disengagement thereof is more readily locatable than the insertion of the hitherto known pins through apertures and provides a much securer arrangement.

The connector members will be formed of any suitable material, e.g. plastics material or of metal and preferably extruded metal, e.g. aluminum. The inter-engaging channel sections of the members are preferably substantially U-shaped with preferably flat shanks with the consequence that the desired parallel displacement must be effected prior to enabling disengagement of the two inter-engaged channel portions. Of course, any other desired shaping may be utilised which will provide a space relative to two interengaged channel sections into which a securing or locking means is readily insertable to prevent releasing disengagement of the channel sections and as will be described hereinafter.

The securing or locking means will preferably comprise a screw member, e.g. a wing bolt, located so as to extend through a wall portion of one connector member which is spaced from the interconnecting channel portion thereof and optionally positionable so as to engage an exterior portion of the other connector member when interengaged with said first mentioned channel portion. The connector member will be so shaped as to provide for optimum screw location and operation of said locking device when in the form of a screw member and for engagement with the outer surface of the other connector member section e.g. a portion of a connector member may be inclined so that the screw means extending therethrough extends substantially at right angles to the surface of the said inclined portion and an extension or projection, preferably countersunk, will be provided on the outside of the channel section of said other member section so as to be engageable by the end of said screw means. As mentioned, any means which is locatable between surface portions of two interengaged connector members to prevent said parallel displacement and subsequent disengagement will suffice and might even comprise a wedge member which may be driven between wall portions of the members or may be any other catch member to prevent said parallel displacement.

The connector device members will preferably be plate-like extruded sections and the portion connectable to the end of a boom section will preferably be a flat portion possibly having a serrated surface for providing gripping engagement with the end of the floating boom and be securable by means of nut and bolt or the like securing means extending through apertures in said connectable portion. Preferably the securing means are engageable on the other side of said boom end against an oppositely located plate so as to clamp the end of the oil boom in sandwich-like fashion therebetween. This other plate may also be serrated and the inboard ends thereof will preferably be radiussed or otherwise rounded adjacent the material of the connectable end.

The invention will be described further, by way of example, with reference to the accompanying drawing which comprises a horizontal section through the two members of a connector device in the interengaged and locked position and with one of the said members being indicated as secured to an end portion of an oil boom section.

A connector device is shown in the drawing and comprises two identical members 1 and 2 made of extruded aluminum and, in the present instance, will have an overall height substantially corresponding to the width of fabric at the end of an oil boom section i.e. will generally correspond to the vertical height in the floating position of an oil boom section, e.g. may have a height of approximately 12–36 inches. It will accordingly be appreciated that the connector members are metal section components generally of identical section. Each member 1 and 2 has a flat, plate-like securable portion 3 and 3' with serrations 4 and 4' engageable with the end fabric 5 (only one end being shown) of an oil boom section (not shown in full) and said securable portion being engageable by securing means in the form of a nut and bolt (not shown) with a backing plate 6 (only one shown) so as to sandwich the boom fabric 5 therebetween. The inboard end portions of the securable portions 3 and 3' and backing plates 6 are radiussed at region 7. The securing bolts are insertable through bore holes 8 (only one shown). Each member 1 and 2 has a substantially U-shaped channel portion 9 and 9' with flat shanks at the end remote from the securable portions 3, 3' for connecting with the boom fabric section 5 and the channel portions of the members are oppositely located on the boom sections so as to be interconnectable. It will be appreciated from the drawing that, in the interengaged position as shown, the two sections 1, 2 cannot be pulled apart in opposite outward directions because of the interengagement of the oppositely arranged channel portions 9, 9' and, by virtue of their shaping and dimensioning, that said channel portions may only be disengaged by pushing the two connector members together so that the channel portions 9, 9' and also portions 3, 3' effect relative parallel displacement until the shanks thereof are sufficiently disengaged to permit separation of the two connector members (as indicated in broken line). It will be appreciated that any securing locking means which prevents said parallel displacement of the channel portions 9, 9' away from each other and the portions 3, 3' parallelly towards each other will lock the components together and it is of importance that such locking means should not comprise any component which requires alignment of holes for insertion of a pin therebetween as has been known hitherto.

The connector device members 1 and 2 are preferably so shaped as to provide a space 10 into which a locking means, in the present instance a wing bolt 11, is insertable by screwing so as to secure the two channel members 1, 2 together. It will be appreciated that the wing bolt 11 is permanently located on one connector member and for locking of two members 1, 2 together all that is required is for the two channel portions 9, 9' to be interengaged and then the wing nut 11 screwed forward so as to prevent parallel displacement of said portions. As an alternative to this, a wedge means might be inserted from above or below into the space 10 to optionally prevent said parallel displacement and disengagement of the two connector device members.

In the particular embodiment described, a portion 12, 12' extends from flat securable portion 3, 3' inclinedly thereto and joins with a portion leading into the channel portion 9, 9' so as to permit the wing bolt 11 to be screwed therethrough at right angles to the surface of the metal. It will be noted that the outside surface of each channel portion has a heel or projecting portion 13, 13' and providing a surface which in the interengaged position of the two channel portions provides a surface substantially at right angles to the longitudinal axis of the wing bolt 11 so as to provide for secure interlocking or interengagement of the components and, preferably, said heel portion is recessed to receive the end of said wing bolt 11. It is possible for each co-operating pair of connector device members 1 and 2 to have only one wing bolt 11 for securing although, since the halves of the channel are generally identical, two such wing bolts 11 may be provided, one for each section—only one wing bolt 11 being shown in the drawings although the heel portion 13 for the other wing bolt is shown as already provided. Preferably, the end of the bolt 11 remote from the wing and which engages with the heel 13' will be burred or otherwise deformed to make the bolt captive, i.e. so that such bolt will not fall out of the aperture in portion 12.

It is to be appreciated that the bolt 11 might be provided in any alternative position so as to ensure undesired displacement of the two interengaged channel portions does not occur and the bolt acts against outside surfaces of the members rather than via apertures as hitherto. It will be appreciated that the inclined portion 12 receiving the wing bolt 11 need not necessarily be provided and the securable portion 3, 3' may run directly into the channel portion 9, 9'.

The oppositely located, identical channel sections 9, 9' are so shaped and dimensioned as to prevent disengagement when located in the position shown by virtue of the nature of their shanks etc. The connector devices do not have to be slid together from the top or bottom as hitherto.

The connector device of the present invention also advantageously permits the joining together of boom lengths of different overall height.

I claim:

1. A connector device for joining the ends of an oil boom length or section to another length or section, comprising two connector members with each member having a portion securable to the end of an oil boom section and, extending from said portion, an interconnecting channel portion shaped and dimensioned so as to co-operate with the oppositely arranged interconnecting channel portion of the other connector member such that when the channel portions are pulled in opposite, outward directions, the channel portions interengage, and such that to disengage the channel portions of two members, the connector members have to execute a parallel or substantially parallel relative displacement with respect to each other with said securable portions moving towards each other before disengagement of the channel portions is possible, and securing or locking means locatable at an angle to said parallel displacement so as to extend into a space into which one of the interengaged channel portions moves after said parallel displacement and disengagement so as to prevent said parallel displacement and thereby interlock the two members, said securing means being also releasable to permit separation of said two members by said parallel displacement.

2. A connector device as claimed in claim 1 wherein the two connector members are identical.

3. A connector device as claimed in claim 1 or 2 wherein the members are formed of plastics material or metal.

4. A connector device as claimed in claim 1 wherein the connector members are formed of extruded aluminium.

5. A connector device as claimed in claim 1 wherein the channel sections of the members are substantially U-shaped.

6. A connector device as claimed in claim 5, wherein the shanks or sides of the channel portions are flat and arranged such that said parallel displacement must be effected prior to enabling disengagement of the two inter-engaged channel portions.

7. A connector device as claimed in claim 1 in which the securing or locking means comprises a screw member located so as to extend through a wall portion of one connector member which portion is spaced from the interconnecting channel portion thereof and optionally positionable so as to engage an exterior portion of the other connector member when interengaged with said first mentioned channel portion.

8. A connector device as claimed in claim 1 wherein an extension or projection is provided on the channel portion of one member so as to be engageable by the securing means of the other.

9. A connector device as claimed in claim 8 wherein the projection has a countersunk portion for receiving the free end of the screw member acting as securing means.

10. A connector device as claimed in claim 1 wherein the securing means is in the form of a screw member and wherein the connector member is so shaped as to provide in operation for axial displacement of said screw member at right angles to the surface of the connector member through which it extends.

11. A connector device as claimed in claim 1, in which one or both connector members are provided with a screw operating securing or locking means.

12. A connector device as claimed in claim 1 wherein the securing portions are platelike and have a serrated portion for gripping the fabric of a boom length.

* * * * *